Sept. 12, 1967     G. M. BAGNARD ET AL     3,341,212
PACKING
Filed June 18, 1964
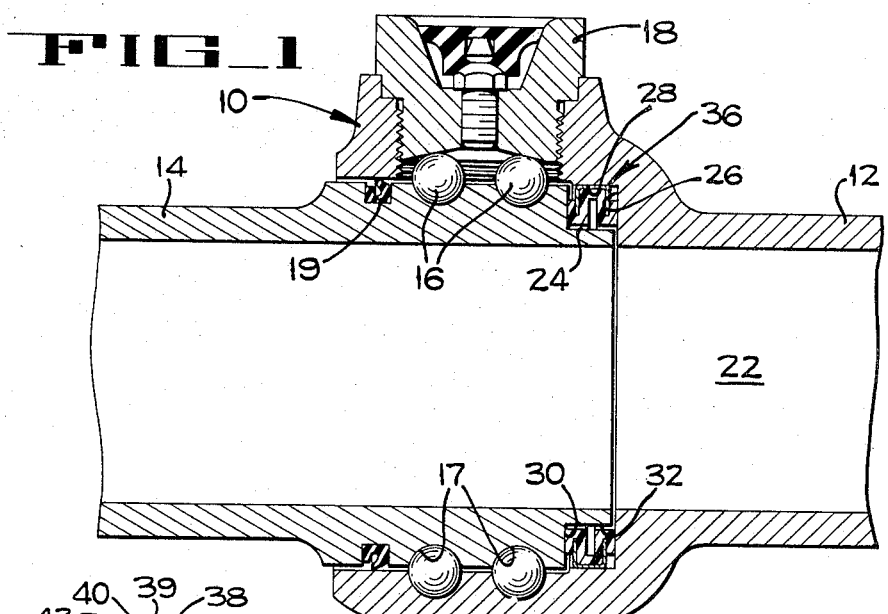
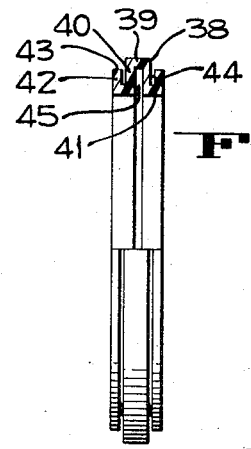
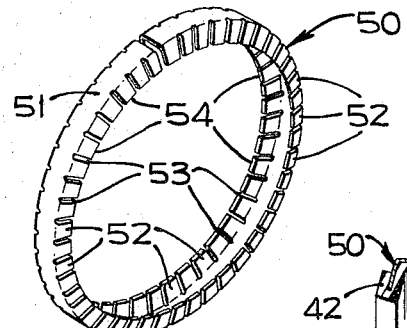
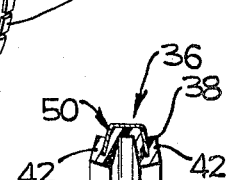
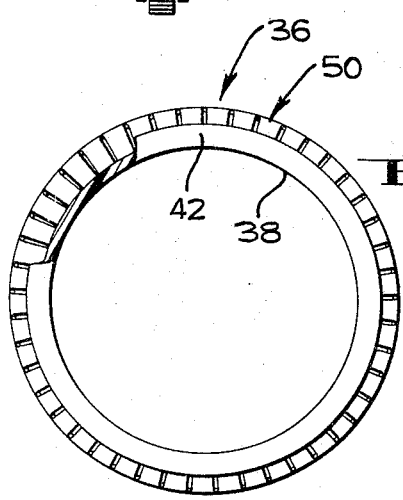
INVENTORS
GUS M. BAGNARD
KENNETH J. DOWNS
BY *Hans G. Hoffmeister*
ATTORNEY

United States Patent Office 3,341,212
Patented Sept. 12, 1967

3,341,212
PACKING
Gus M. Bagnard, Anaheim, and Kenneth J. Downs, Yorba Linda, Calif., assignors to FMC Corporation, a corporation of Delaware
Filed June 18, 1964, Ser. No. 376,038
9 Claims. (Cl. 277—206)

The present invention pertains to a packing and more particularly to a packing especially useful in a swivel joint for handling strong acids or other corrosive fluids.

It has been known to provide a packing for a swivel joint which uses a metallic energizer for pressing a non-elastomeric plastic seal into fluid-tight engagement with the walls of the packing chamber. Within certain pressure and temperature ranges, and for handling many types of fluids, this packing is very satisfactory. However, certain packings of this construction position the metallic spring energizer so that it is directly exposed to the fluids being handled. Since the energizer is usually constructed of a very thin spring metal, it is easily destroyed in the presence of strong acids. Thus, even though the non-elastomeric plastic seal resists the action of the acids, the energizer does not and as a result, the packing fails. The present invention overcomes this problem in packings.

It is an object of the present invention to provide an improved packing for a pipe joint.

Another object is to provide a packing which can operate successfully in the presence of strong acids, or other corrosive fluids.

Another object is to provide a packing using a metallic energizer which is isolated from the fluid being conducted by a seal which is inert to the action of the fluid.

Another object is to provide a packing using a non-elastomeric seal having no appreciable resilient compressibility and a spring energizer which imparts its resilience to the seal for maintaining a fluid-tight seal notwithstanding irregularities in the sealing interface.

Another object is to provide a packing which is mounted in a chamber of a swivel joint in such a manner as to minimize wear of the packing.

These, together with other objects, will become apparent upon reference to the following description and accompanying drawing in which:

FIGURE 1 is a longitudinal diametric section of a swivel joint incorporating the packing of the present invention.

FIGURE 2 is an elevational view, partly in section, of the seal of the subject packing.

FIGURE 3 is a perspective of the energizer of the subjeck packing.

FIGURE 4 is a view partly in elevation and partly in section of the packing.

FIGURE 5 is a face view of the packing, partly broken away to show the spring fingers of the energizer in more detail.

Referring more particularly to the drawings, a swivel joint is generally indicated by the numeral 10 in FIGURE 1. This swivel joint includes a female conduit 12, a male conduit 14 rotatably mounted within the female conduit by balls 16 located in races 17 and being retained therein by a plug 18. Furthermore, a dust seal 19 is located in a groove in the male member and seals against the female member.

The swivel joint 10 has a flow passage 22 which is circumscribed by a packing chamber 24. The chamber is defined by a first radial wall 26 and an outer cylindrical wall 28 both part of the female conduit 12, and by a second radial wall 30 and inner cylindrical wall 32 both of which are part of the male conduit and respectively are in confronting relation to the first radial and cylindrical walls. The chamber is in fluid communication with the flow passage through a gap between the inner cylindrical wall 32 and the first radial wall. Although the swivel joint shown has an inner cylindrical wall, it is sometimes omitted and is not necessary for use of the subject invention.

A packing 36 embodying the present invention includes an annular, non-elastomeric seal 38 preferably of a plastic material such as Teflon or polyethylene. An important characteristic of this seal is its acid resistance. The seal has a cylindrical intermediate wall 39, parallel inner flanges 40 integral with the intermediate wall and projecting inward therefrom, webs 41 projecting axially in opposite directions from the inner flanges, and outer flanges 42 integral with the webs and projecting outward therefrom in spaced parallel relation with their adjacent inner flanges. The outer flanges terminate in peripheral edges 43 which are spaced radially inward of the outer surface of the intermediate wall. Furthermore, the confronting inner and outer flanges define outwardly directed annular grooves 44 and the spaced confronting inner flanges define an inwardly directed channel 45. The seal, because of its material, is relatively rigid although the inner flange, web, and outer flange on opposite sides of the intermediate wall are capable of flexing to a limited degree with respect to the intermediate wall.

The subject packing 36 also includes an energizer 50 which is preferably of metal because metal imparts the most desirable energizing effect. The energizer 50 includes a split annular intermediate portion 51 having a maximum diameter slightly larger than the diameter of the outer wall 28 of the chamber 24, that is when the intermediate portion of the energizer is in an unstressed condition. Furthermore, the energizer includes a plurality of tabular spring fingers 52 integral with the intermediate portion and projecting inward therefrom with confronting fingers on opposite sides of the intermediate portion diverging with respect to each other and being resiliently flexibly movable toward each other. Adjacent fingers on each side of the intermediate portion are in contiguous relation, being separated by narrow slits 53. Furthermore, each of the fingers terminates in an edge 54, and all of the edges of the fingers on each side of the intermediate portion define a substantially continuous circle. In order that the fingers be as close together as possible, adjacent sides of adjacent fingers converge toward said edges.

The energizer 50 is diametrically spread apart and fitted over the seal 38 with the intermediate portion 51 overlying the intermediate wall 39 and with the spring fingers 52 projecting into the grooves 44. Because of the divergence of confronting fingers and the limited flexibility of the flanges 40 and 42, the flanges are spread apart into the divergent relationship illustrated in FIGURE 4.

In use, the packing 36 is mounted in the chamber 24 with the intermediate portion 51 of the energizer 50 diametrically constricted by the outer cylindrical wall 28 of the chamber; in this manner, the packing is held stationary with respect to the female conduit 12 thereby eliminating wear of the intermediate portion of the energizer as a result of relative rotation between the conduits 12 and 14. When the male and female conduits are interconnected by the balls 16, the radial walls 26 and 30 press the flanges 40 and 42 and the confronting rows of fingers 52 into generally parallel relation, as illustrated in FIGURE 1. Since the fingers are thereby held in a stressed condition, they yieldably urge their respective outer flanges 42 into fluid-tight engagement with the adjacent radial walls 26 and 30. Furthermore, and of major significance insofar as the present invention is concerned, the seal 38 isolates the energizer 50 from fluid in the passage 22. Therefore, even if this fluid is a very strong acid which would ordinarily deteriorate the relatively thin energizer, such fluid has no effect on the subject packing since the seal is inert to such fluid and the energizer is isolated from it.

Another point worthy of note is the channel 45 which admits fluid from the passage 22 so that fluid pressure is exerted against the inner flanges 40 and helps in obtaining an even greater fluid-tight engagement between the outer flanges 42 and their respective radial walls 26 and 30.

Although the outer flanges 42 of the seal 38 have no appreciable resilient compressibility, they still maintain a very effective seal and accommodate themselves to irregularities in the sealing interfaces (between the outer flanges 42 and the walls 26 and 30) because of the multiplicity of resilient pressure points provided by the individual spring fingers 52. Thus, an effective static seal is provided between the outer flange 42 and the first radial wall 26 and an effective dynamic seal is provided between the outer flange 42 and the second radial wall 30. The low coefficient of friction of the seal facilitates rotation at the dynamic sealing interface.

From the foregoing, it is evident that an improved packing has been provided and that this packing is particularly useful in swivel joints which handle corrosive fluids, such as strong acids. The important characteristic of the packing is the isolation of an energizer, normally non-resistant to corrosive fluids, by a seal which is resistant to such fluids. The subject packing has proved to be an excellent solution to the problem of energizer vulnerability in the presence of corrosive fluids.

Although a preferred embodiment of the present invention has been shown and described, it will be understood that various changes and modifications may be made in the details thereof without departing from the spirit and scope of the appended claims.

Having thus described our invention, what is claimed as new and desired to be secured by Letters Patent is as follows:

1. A packing comprising an annular seal having a substantially generally axially extending cylindrical intermediate wall having inner and outer surfaces, inner flanges projecting inward from said intermediate wall, said inner flanges having generally radially extending inside surfaces in confronting relation to each other, said inner flanges having outside surfaces facing in opposite directions from each other, webs projecting generally axially outward in opposite directions from said inner flanges, and outer flanges projecting outward from said webs, said outer flanges having inside surfaces in confronting spaced relation to the outside surfaces of their adjacent inner flanges thereby defining annular grooves on opposite sides of the intermediate wall; and an energizer including an intermediate portion confronting said intermediate wall and extending circumferentially thereof, and a plurality of spring fingers integral with said intermediate portion and extending divergently therefrom into said grooves for resiliently bearing against said outer flanges.

2. The packing of claim 1 wherein said intermediate portion is radially split and thereby has adjacent separable ends, and wherein said spring fingers are releasably frictionally engaged with said flanges in order to releasably retain said fingers in said grooves and thus said energizer in separable circumscribing relation to said seal.

3. The packing of claim 1 wherein said seal is made of relatively rigid non-elastomeric plastic material, wherein said seal has a substantially non-yielding annular shape, wherein said intermediate portion of the energizer is radially split and wherein said energizer is separable from the seal upon removing said fingers from the grooves.

4. In a swivel joint including a flow passage and an annular chamber circumscribing and communicating with said passage, said chamber being defined by a substantially cylindrical wall and a pair of confronting walls in angular relation to said cylindrical wall; a packing comprising an annular seal in said chamber, said seal having a cylindrical intermediate wall extending circumferentially of said cylindrical wall of the chamber, confronting inner flanges projecting from said intermediate wall, webs integral with and projecting in opposite directions from said inner flanges, and outer flanges projecting from said webs and individually in engagement with said confronting walls of said chamber, said intermediate wall, inner flanges, webs and outer flanges all being of substantially the same thickness; and a spring energizer including an intermediate portion extending around said intermediate wall of the seal, said energizer further including a plurality of spring fingers integrally connected to said intermediate portion and extending therefrom between the inner and outer flanges on opposite sides of said seal, said fingers resiliently urging said outer flanges into fluid-tight engagement with the confronting walls of the chamber.

5. In the swivel joint of claim 4 wherein the intermediate portion of the energizer is in friction-tight engagement with the cylindrical wall of the chamber.

6. In the swivel joint of claim 4 wherein the inner flanges of the seal project inward and the outer flanges of the seal project outward.

7. In the swivel joint of claim 4, said inner flanges being in spaced relation to each other and defining a channel communicating with said flow passage for admitting fluid from the flow passage therebetween in order to aid said spring fingers in pressing the outer flanges against said projecting walls.

8. A packing comprising an annular sealing member of acid-resistant material having an intermediate annular portion and a pair of flanged sealing portions projecting inward from the intermediate portion in confronting relation to each other and having outwardly directed annular grooves on opposite sides of the intermediate portion, said flanged sealing portions being movable away from each other relative to said intermediate portion, and energizing means extending circumferentially of said intermediate portion and projecting into said grooves, said energizing means including a plurality of spring fingers in said grooves which fingers yieldably bear outwardly against said sealing portions, adjacent fingers in each groove being in nearly contacting relation so as to provide a substantially continuous circle of pressure on said sealing portions while permitting individual flexing moment of each of said fingers both toward and away from said sealing portions independently of the other said fingers.

9. The packing of claim 4 wherein said material is selected from the group consisting of Teflon and polyethelene.

References Cited

UNITED STATES PATENTS

| | | | |
|---|---|---|---|
| 1,947,623 | 2/1934 | Shimer | 277—237 |
| 1,993,268 | 3/1935 | Ferguson | 277—89 |
| 2,220,947 | 11/1940 | Paton | 277—141 |
| 2,326,489 | 8/1943 | Payne | 277—84 |
| 2,512,883 | 6/1950 | Warren | 277—235 |
| 2,518,443 | 8/1950 | Bagnard | 285—276 |
| 2,549,951 | 4/1951 | Warren | 285—276 |
| 3,114,561 | 12/1963 | Creath et al. | 277—152 |

FOREIGN PATENTS

| | | |
|---|---|---|
| 862,046 | 11/1940 | France. |
| 4,188 | 3/1886 | Great Britain. |
| 557,139 | 2/1957 | Italy. |

LAVERNE D. GEIGER, *Primary Examiner.*

D. B. MASSENBERG, *Assistant Examiner.*